United States Patent
Goldenfield et al.

(10) Patent No.: US 7,085,340 B2
(45) Date of Patent: Aug. 1, 2006

(54) NUCLEAR REACTOR FUEL ASSEMBLIES

(75) Inventors: Mark P. Goldenfield, Columbia, SC (US); Quang M. Nguyen, Irmo, SC (US); Gregory E. Settle, Elgin, SC (US); Radu O. Pomirleanu, West Columbia, SC (US); Abdelaziz M. Elmahdi, Columbia, SC (US); Lewis A. Walton, Forest, VA (US); Raymond W. Brashier, Columbia, SC (US)

(73) Assignee: Westinghouse Electric Co, LLC, Pittsburgh, PA (US)

( * ) Notice: Subject to any disclaimer, the term of this patent is extended or adjusted under 35 U.S.C. 154(b) by 0 days.

(21) Appl. No.: 10/657,025

(22) Filed: Sep. 5, 2003

(65) Prior Publication Data

US 2005/0069080 A1    Mar. 31, 2005

(51) Int. Cl.
*G21C 3/34*     (2006.01)

(52) U.S. Cl. ............... 376/438; 376/439; 376/441; 376/442

(58) Field of Classification Search ............... 376/438, 376/439, 441, 442
See application file for complete search history.

(56) References Cited

U.S. PATENT DOCUMENTS

| | | | | |
|---|---|---|---|---|
| 3,379,619 A | * | 4/1968 | Andrews et al. ............ | 376/439 |
| 4,058,436 A | * | 11/1977 | Anthony ..................... | 376/442 |
| 4,061,536 A | * | 12/1977 | Creagan et al. ............. | 376/439 |
| 4,155,807 A | * | 5/1979 | Schreiber et al. ........... | 376/438 |
| 4,357,298 A | * | 11/1982 | Wolters et al. .............. | 376/438 |
| 4,692,302 A | * | 9/1987 | DeMario et al. ............ | 376/439 |
| 4,698,204 A | * | 10/1987 | Taleyarkhan ................ | 376/439 |
| 4,762,669 A | | 8/1988 | Doshi | |
| 4,804,516 A | * | 2/1989 | Thomazet et al. .......... | 376/439 |
| 4,827,063 A | * | 5/1989 | Bokers et al. .............. | 376/439 |
| 4,832,901 A | * | 5/1989 | Dailey ........................ | 376/439 |
| 4,844,861 A | * | 7/1989 | Leclercq ..................... | 376/439 |
| 5,183,629 A | * | 2/1993 | Canat et al. ................. | 376/439 |
| 5,229,068 A | * | 7/1993 | Johansson et al. .......... | 376/439 |
| 5,263,072 A | * | 11/1993 | Canat et al. ................. | 376/439 |
| 5,515,408 A | * | 5/1996 | Oyama et al. .............. | 376/441 |
| 6,385,271 B1 | | 5/2002 | Nylund | |
| 6,526,116 B1 | | 2/2003 | Nguyen et al. | |

FOREIGN PATENT DOCUMENTS

| | | | | |
|---|---|---|---|---|
| JP | 0128482 | * | 7/1984 | ................. 376/439 |
| JP | 2192690 | * | 8/1987 | ................. 376/438 |

OTHER PUBLICATIONS

Merriam-Webster's Collegiate Dictionary, 10th Edition, p. 1.*

* cited by examiner

*Primary Examiner*—R. J. Palabrica (57) ABSTRACT

A nuclear fuel assembly having a parallel array of elongated fuel elements supported between an upper and lower nozzle. Main support grids are substantially evenly spaced along the elongated dimension of the assembly to maintain the spacing between fuel elements. A plurality of auxiliary vibration-resistant grids respectively positioned between the main support grids in the middle third elongated dimension of the fuel elements, that are smaller in height and provide a larger fuel element contact area than the main support grids.

10 Claims, 6 Drawing Sheets

NUCLEAR REACTOR FUEL ASSEMBLIES

BACKGROUND OF THE INVENTION

1. Field of the Invention

The present invention relates generally to fuel assemblies for a nuclear reactor and, more particularly, is concerned with fuel assemblies positioned adjacent the baffle structure about the periphery of the reactor core, which employ anti-vibration grids.

2. Related Art

A typical nuclear power reactor includes a reactor vessel housing a nuclear reactor core. Spaced radially, inwardly from the reactor vessel is a generally cylindrical core barrel and within the barrel is a former and a baffle system (hereafter called the "baffle structure"), which permits transition from the cylindrical barrel to a squared-off periphery of the reactor core formed by the fuel assemblies arrayed therein.

The reactor core is composed of a large number of elongated fuel assemblies. Each fuel assembly includes a plurality of fuel rods containing the fissile material, which reacts to produce heat. The fuel rods of each fuel assembly are held in an organized array by a plurality of grids spaced axially along the fuel assembly length and attached to a plurality of elongated control rod guide thimbles of the fuel assembly.

During operation of the reactor, a coolant fluid such as water is typically pumped into the reactor vessel through a plurality of inlet nozzles. The coolant fluid passes downward through an annular region defined between the reactor vessel and the core barrel, turns in a lower plenum defined in the reactor vessel, then passes upwardly through the fuel assemblies of the reactor core, and exits from the vessel through a plurality of outlet nozzles extending through the core barrel. Heat energy, which the fuel rods of the fuel assemblies impart to the coolant fluid, is carried off by the fluid from the vessel. Due to the existence of holes in the core barrel, coolant fluid is also present between the barrel and a baffle structure and at a higher pressure than within the core. However the baffle structure, together with the core barrel, do separate the coolant fluid from the fuel assemblies as the fluid flows downwardly through the annular region between the reactor vessel and core barrel.

As mentioned above, the baffle structure surrounds the fuel assemblies of the reactor core. Typically, the baffle structure is made of plates joined together by bolts. These bolts sometimes become loose, thereby developing a small gap between the baffle structure plates. When this happens, a coolant fluid jetting action takes place through the baffle structure in a radially inward direction from the exterior of the core to the interior thereof, due to the greater fluid pressure existing outside of the baffle than within the core. In some reactors, the baffle structure contains slots and holes intentionally placed to allow cooling of the core during an accident condition. As with the gaps that open due to loose bolts, the coolant flow enters the core through the baffle slots and holes and causes fluid jetting. The fluid jetting, when it impinges on the outer row of fuel assemblies in the core, makes the outer fuel rods vibrate, eventually causing them to fail. Consequently, the need exists for a way to deal effectively with the fluid jetting through portions of the baffle structure so as to avoid its deleterious affects on the fuel rods of the fuel assemblies positioned adjacent the baffle structure.

SUMMARY OF THE INVENTION

The present invention provides fuel assemblies with anti-vibration grids which are designed to satisfy the aforementioned needs. In particular, in accordance with this invention, all fuel assemblies in the reactor core employ a new additional grid structure intermediate at least some of the main support grids at an elevation along the fuel assembly in the mid-third region where analytical results have demonstrated the highest exposure to vibration due to crossflow, exists.

In a preferred embodiment, the intermediate support grid comprises a series of intersecting thin metal straps in an egg crate design that forms square cells around the fuel rods. Coplanar dimples and/or springs contact the fuel rods on multiple sides and provide additional rod support. The location of the grid is fixed relative to the fuel assembly at thimble tube locations. The strap heights of the auxiliary support grids are smaller than that of the main support grids and the auxiliary support grids do not include mixing vanes, which can be found on the main support grids. The outer strap includes guide tabs to prevent hang-up with adjacent fuel assemblies during removal or insertion respectively out of or into the reactor core. The inner strap is designed to help eliminate fretting wear by increasing the contact area of the spring/dimple with the fuel rod over the corresponding contact area on the main support grids.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

In the following description, like reference characters designate like or corresponding parts throughout the several views of the drawings. Also in the following description, it is to be understood that such terms as "forward", "rearward", "left", "right", "upwardly", "downwardly" and the like are words of convenience and are not to be construed as limiting terms.

Figure 1:
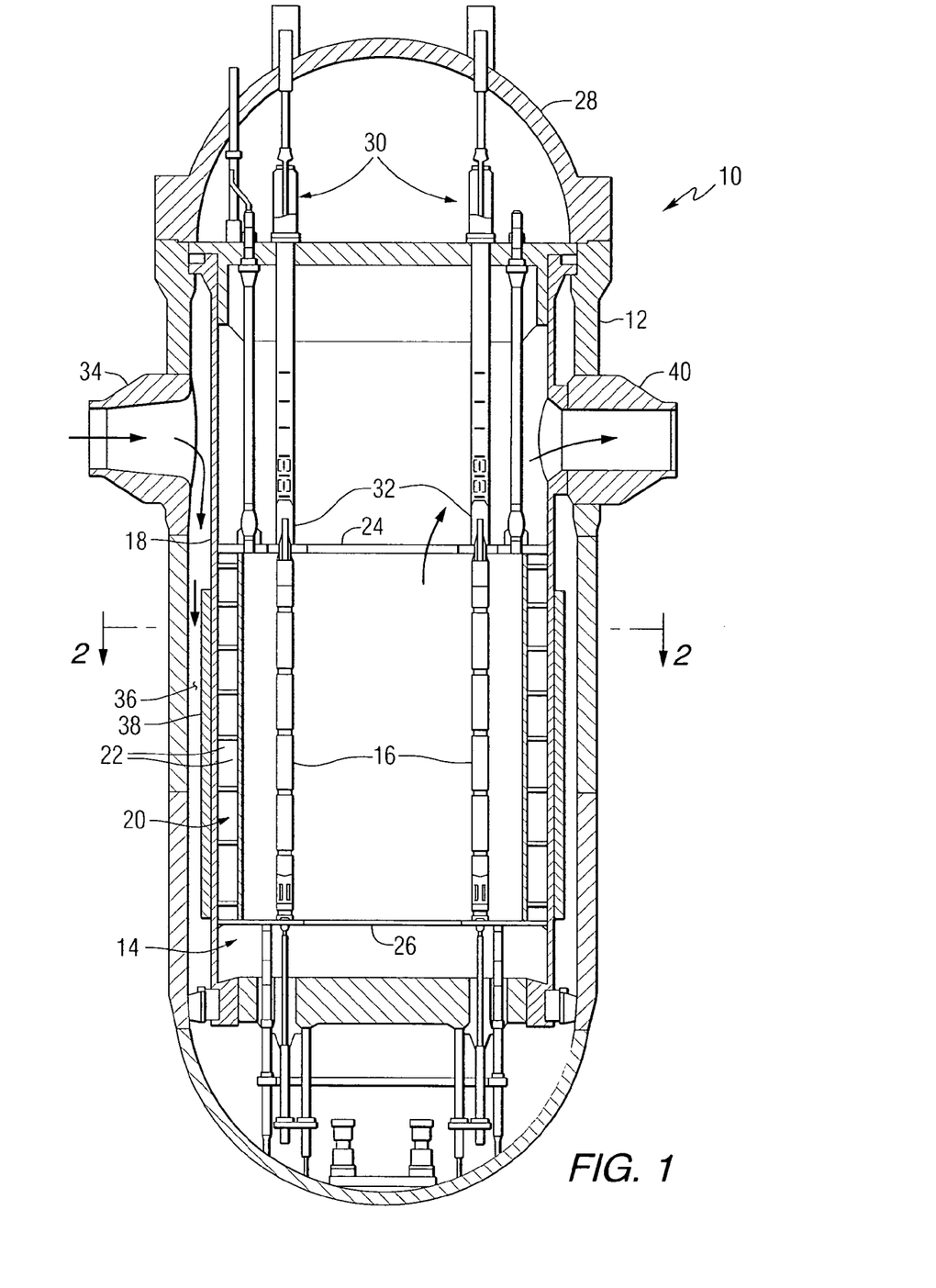
FIG. 1 is a view, partly in section and partly in elevation, of a nuclear reactor to which the present invention may be applied.
Figure 2:
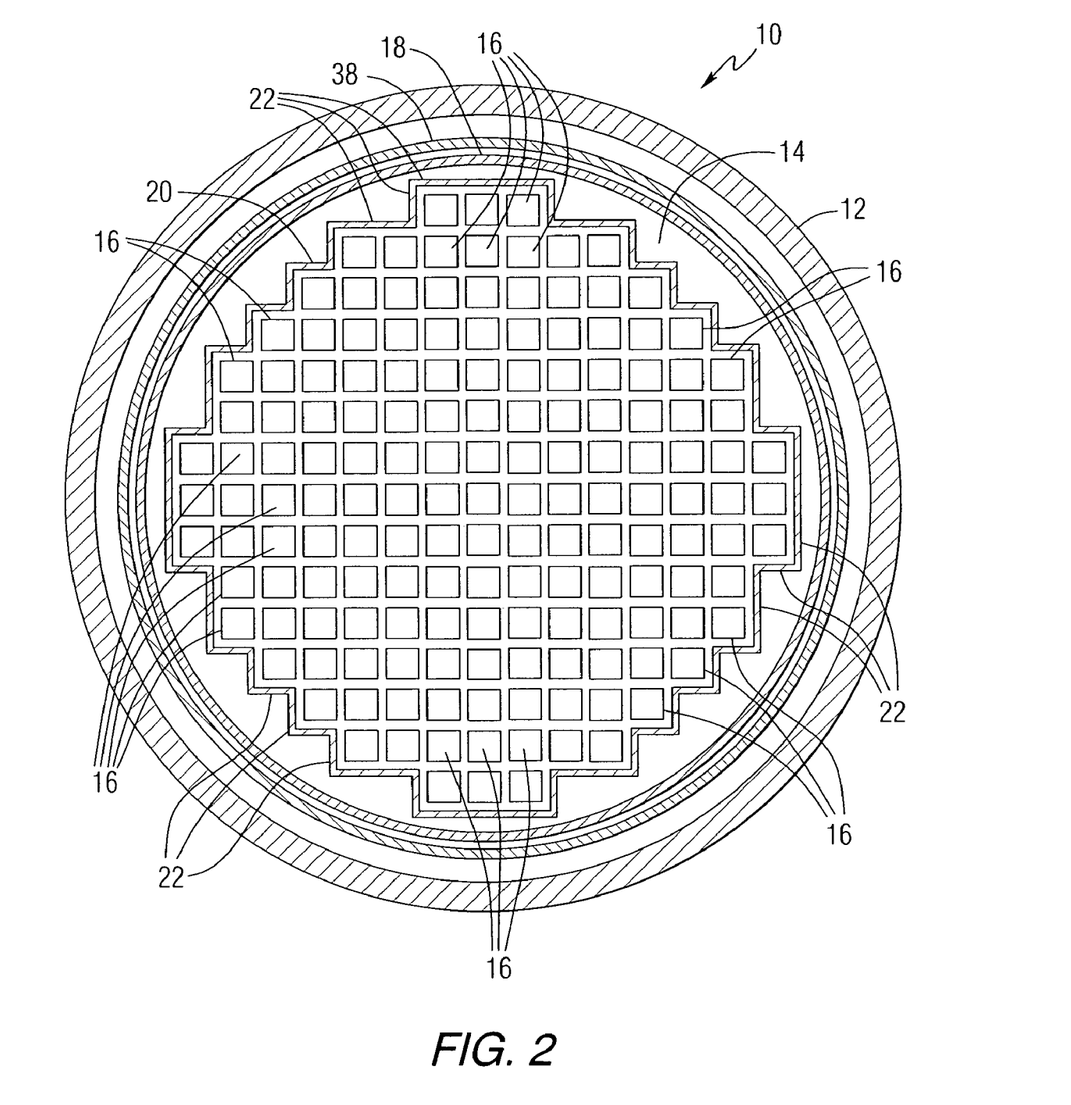
FIG. 2 is a simplified enlarged plan view of the reactor taken along line 2—2 of FIG. 1.

Referring now to the drawings, and particularly to FIGS. 1 and 2, there is shown a pressurized water nuclear reactor (PWR) being generally designated by reference character 10. The PWR 10 includes a reactor pressure vessel 12 which houses a nuclear reactor core 14 composed of a plurality of elongated fuel assemblies 16. The relatively few fuel assemblies 16 shown in FIG. 1 are for purposes of simplicity only. In actuality, as schematically illustrated in FIG. 2, the core 14 is composed of a great number of fuel assemblies 16.

Spaced radially, inwardly from the reactor vessel 12 is a generally cylindrical core barrel 18 and within the barrel 18 is a former and baffle system, hereinafter called a "baffle structure" 20, which permits transition from the cylindrical barrel 18 to a squared-off periphery of the reactor core 14 formed by the plurality of fuel assemblies 16 being arrayed therein. The baffle structure 20 surrounds the fuel assembly 16 of the reactor core 14. Typically, the baffle structure 20 is made of plates 22 joined together by bolts (not shown). The reactor core 14 and the baffle structure 20 are disposed between upper and lower core plates 24,26 which, in turn, are supported by the core barrel 18.

The upper end of the reactor pressure vessel 12 is hermetically sealed by a removable hemispherical closure head 28 upon which are mounted a plurality of control rod drive mechanisms 30. Again for simplicity, only a few of the many control rod drive mechanisms 30 are shown. Each drive mechanism 30 selectively positions a rod cluster control mechanism 32 above and within some of the fuel assembly 16.

A nuclear fission process carried out in the fuel assemblies 16 of the reactor core 14 produces heat which is removed during operation of the PWR 10 by circulating a coolant fluid, such as light water, through the core 14. More specifically, the coolant fluid is typically pumped into the reactor pressure vessel 12 through a plurality of inlet nozzles 34 (only one of which is shown in FIG. 1). The coolant fluid passes downward through an annular downcomer region 36 defined between the reactor vessel 12 and the core barrel 18 (and a thermal shield 38 on the core barrel) until it reaches the bottom of the reactor vessel 12 where it turns 180° prior to flowing up through the lower core plate 26 and then the reactor core 14. On flowing upward through the fuel assembly 16 of the reactor core 14, the coolant fluid is heated to reactor operating temperatures by the transfer of heat energy from the fuel assembly 16. The hot coolant fluid then exits the reactor vessel 12 through a plurality of outlet nozzles 40 (only one being shown in FIG. 1) extending through the core barrel 18. Thus, heat energy which the fuel assembly 16 imparts to the coolant fluid, is carried off by the fluid from the pressure vessel 12.

Due to the existence of pressure relief holes (not shown) in the core barrel 18, coolant fluid is also present between the barrel 18 and baffle structure 20 and at a higher pressure than exists within the core 14. However the baffle structure 20, together with the core barrel 18, do separate the coolant from the fuel assemblies 16 as the fluid flows downwardly through the annular region 36 between the reactor vessel 12 and core barrel 18.

Figure 3:
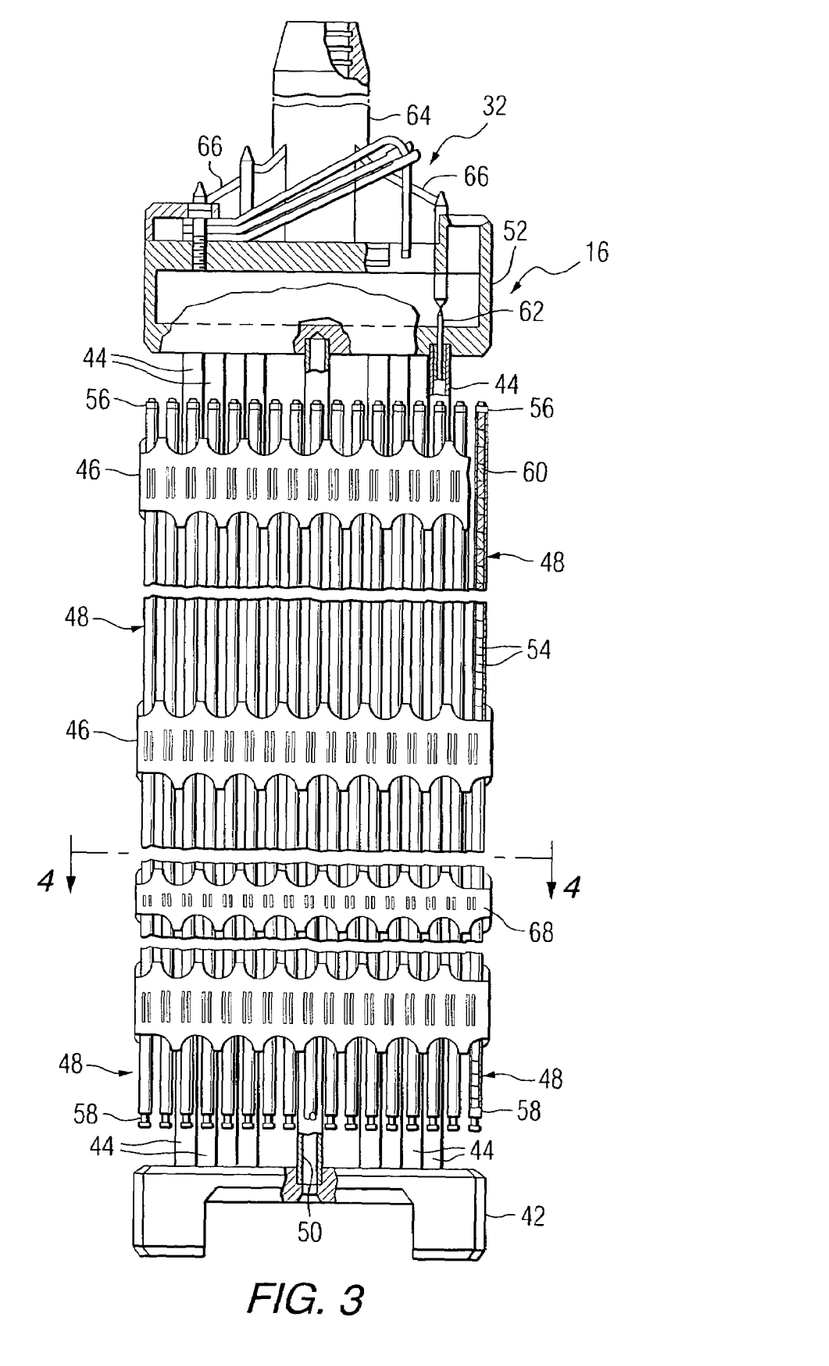
FIG. 3 is an elevational view, partly in section, of one of the fuel assemblies employing an anti-vibration grid shown in FIG. 2.

As briefly mentioned above, the reactor core 14 is composed of a large number of elongated fuel assemblies 16. Turning to FIG. 3, each fuel assembly 16, being of the type used in the PWR 10, basically includes a lower end structure or bottom nozzle 42, which supports the assembly on the lower core plate 26 and a number of longitudinally-extending guide tubes or thimbles 44, which project upwardly from the bottom nozzle 42. The assembly 16 further includes a plurality of regular, traverse, main support grids 46 axially-spaced along the lengths of the guide thimbles 44 and are attached thereto. The main support grids 46 are substantially, evenly, longitudinally-spaced and support a plurality of elongated fuel rods 48 in an organized spaced array. Additionally, each assembly 16 has an instrumentation tube 50 located in the center thereof and an upper end structure or top nozzle 52 attached to the upper ends of the guide thimbles 44. With such an arrangement of parts, the fuel assembly 16 forms an integral unit capable of being conveniently handled without damaging the assembly parts.

Each fuel rod 48 of the fuel assembly 16 includes nuclear fuel pellets 54 and the opposite ends of each fuel rod are closed by upper and lower end plugs 56,58 to hermetically seal the rod. Commonly, a plenum spring 60 is disposed between the upper end plug 56 and the pellets 54 to maintain the pellets in a tightly stacked tandem array within the rod 48. The fuel pellets 54 composed of fissile material are responsible for creating the reactive power which generates heat in the core 14 of the PWR 10. As mentioned, the coolant fluid is pumped upwardly through each of the fuel assemblies 10 of the core 14 in order to extract heat generated therein for the production of useful work.

To control the fission process, a number of control rods 62 of each rod cluster control mechanism 32 are reciprocally moveable in the guide thimbles 44 located at predetermined positions in the fuel assembly 16. However, not all of the fuel assemblies 16 have rod cluster control mechanisms 32, and thus control rods 62, associated therewith. Though typically, the fuel assemblies that accommodate control rods are of the same design as other fuel assemblies within the core that do not have control rods associated therewith. Specifically, each rod cluster control mechanism 32 is associated with a top nozzle 52 of the corresponding fuel assembly 16. The control mechanism 32 has an internally-threaded cylindrical member 64 with a plurality of radially extending arms 66. Each arm 66 is interconnected to one or more control rods 62 such that the control mechanism 32 is operable to move the control rods 62 vertically in the guide thimbles 44 to thereby control the fission process in the fuel assembly 16, all in a well known manner.

All of the fuel assemblies 16 in the reactor core 14 have the conventional construction just described. In addition, each of the fuel assemblies of this invention employs anti-vibration grids 68, a preferred embodiment of which is shown in FIGS. 6 and 7, and more fully described hereafter.

As mentioned earlier, the baffle structure 20, which surrounds the fuel assemblies 16 of the reactor core 14, is made of plates 22 joined together by bolts (not shown). As the result of thermal cycling during startups and shutdowns of the system, these bolts sometimes become loose, thereby developing small gaps between the baffle structure plates 22. When this happens, a jetting action of the coolant fluid takes place through the baffle structure 20 in a radially inward direction from the exterior to the interior of the core due to the greater fluid pressure existing outside of the baffle structure 20 than within the core 14. In some reactors, the baffle structure contains slots and holes intentionally placed to allow cooling of the core during an accident condition. As with the gaps that open due to loose bolts, the coolant flow enters the core through the baffle slots and holes and causes fluid jetting. In absence of one or more of the anti-vibration grids 68 in the fuel assemblies 16 in the core 14, the fluid jets impinging upon the fuel assemblies would make their outer fuel rods 48 vibrate, resulting in fretting of the fuel rod cladding and possibly causing failure. The auxiliary anti-vibration grids 68 differ somewhat in construction from the main support grids, as will be appreciated hereafter.

Figure 4:
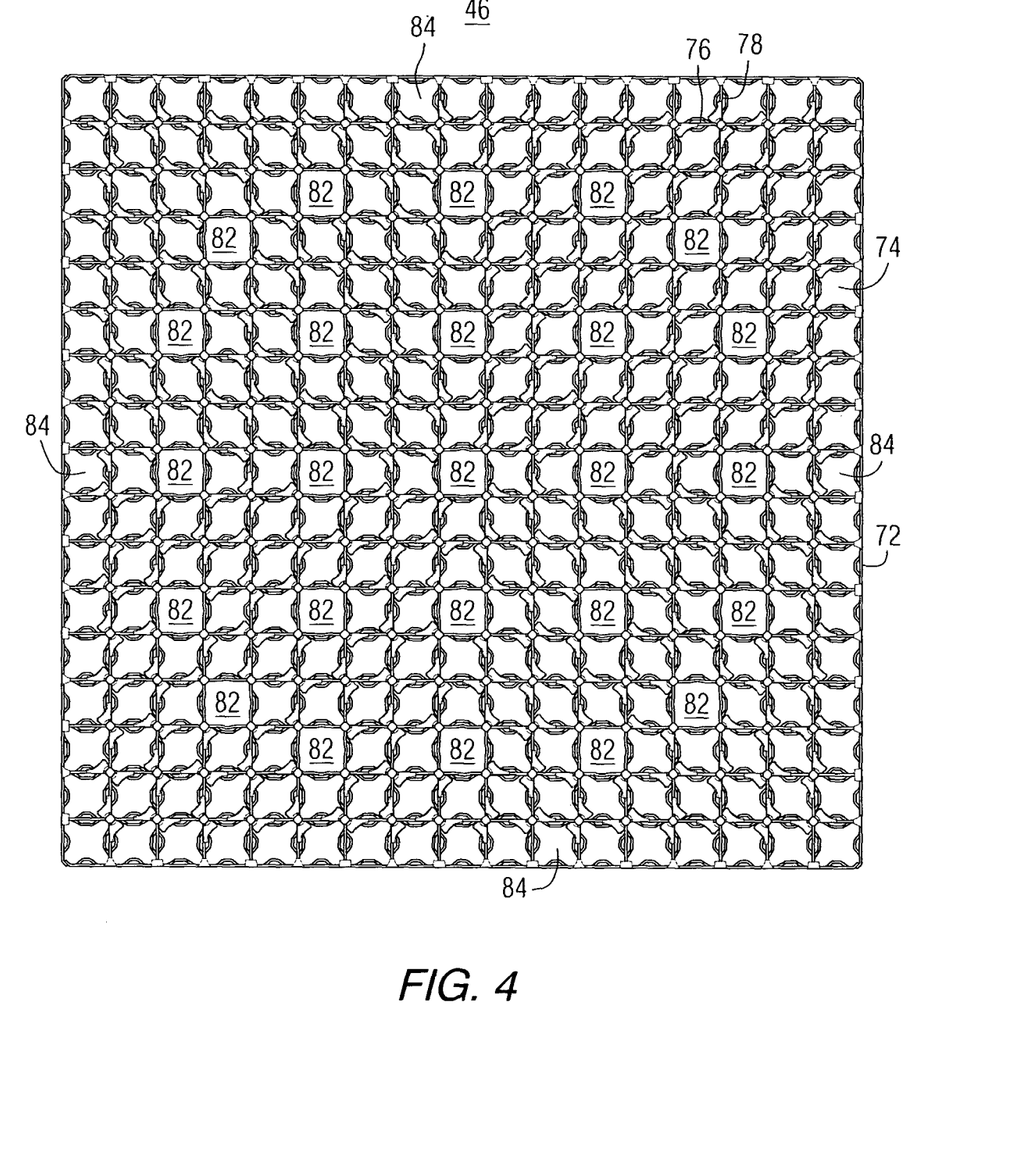
FIG. 4 is an elevational view of one embodiment of a main support grid.
Figure 5:
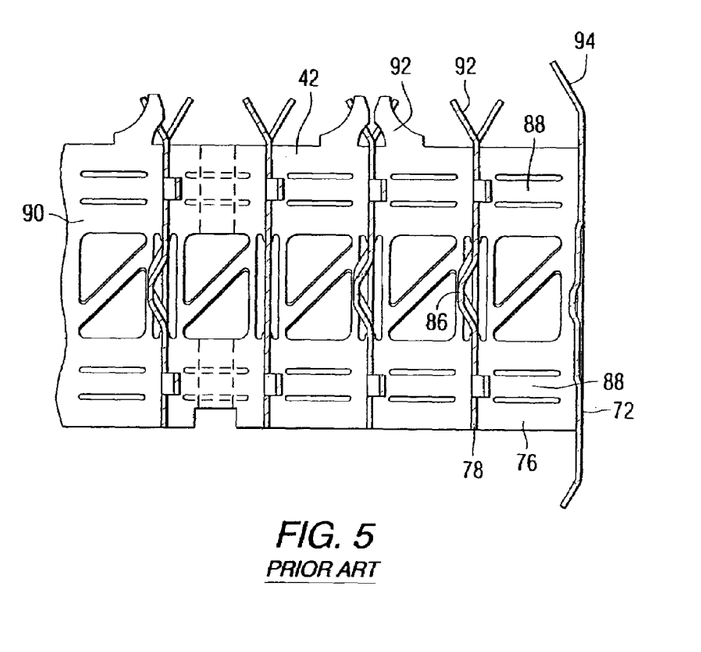
FIG. 5 is a side elevation of one of the interior straps of the lattice assembly forming the cells of one embodiment of a main support grid.

Referring to FIGS. 4 and 5, one embodiment of a main support grid 46 is illustrated basically includes a plurality of interleaved inner and outer straps 76 and 78 arranged and connected together, such as by welding, in an egg crate configuration to define a plurality of hollow cells 74 open at their opposite ends. FIG. 6 illustrates a 15×15 array of cells 74, though it should be appreciated that the application of the principles of this invention are not affected by the number of fuel elements in an assembly and the assembly could just as well have a 17×17 array of cells 74 such as is illustrated in FIG. 4. The lattice straps, which form the orthogonal members 76 and 78 shown in FIG. 4, are substantially identical in design and are better illustrated in FIG. 5. While the lattice straps 76 and 78 are substantially identical, it should be appreciated that the design of some lattice straps 76 may vary from other lattice straps 76 as well as some straps 78 vary from other straps 78, to accommodate guide tube and instrument tube locations. Reference character 82 in FIG. 4 identifies those cells that are attached to guide tubes and instrumentation thimble while reference character 84 refers to the remaining cells which support fuel elements. FIG. 5 provides the best view of the orthogonal intersections between lattice straps 82 and 84. Most walls of the cells that accommodate fuel elements are provided with a number of stamped, protruding segments that are tooled by appropriate dyes as is known and used in the industry. The spring and dimple pattern shown in FIG. 5 is for a conventional main support grid 46 with the spring portion identified by reference character 86 and the dimples represented by reference character 88. The upper and lower stamped segments 88 bulge out in one direction and form dimples for supporting the fuel elements against juxtaposed diagonal springs 86, which protrude from the opposite cell wall. The remaining centrally-located stamp section 86 in the same wall as the previously described dimples 88 bulges in the opposite direction into the adjacent cell and forms a diagonal spring for pressuring the fuel element against dimples 88 which protrude into the adjacent cell from its opposite wall. The walls 90 of a main support grid are typically 5.2 cm high.

Figure 6:
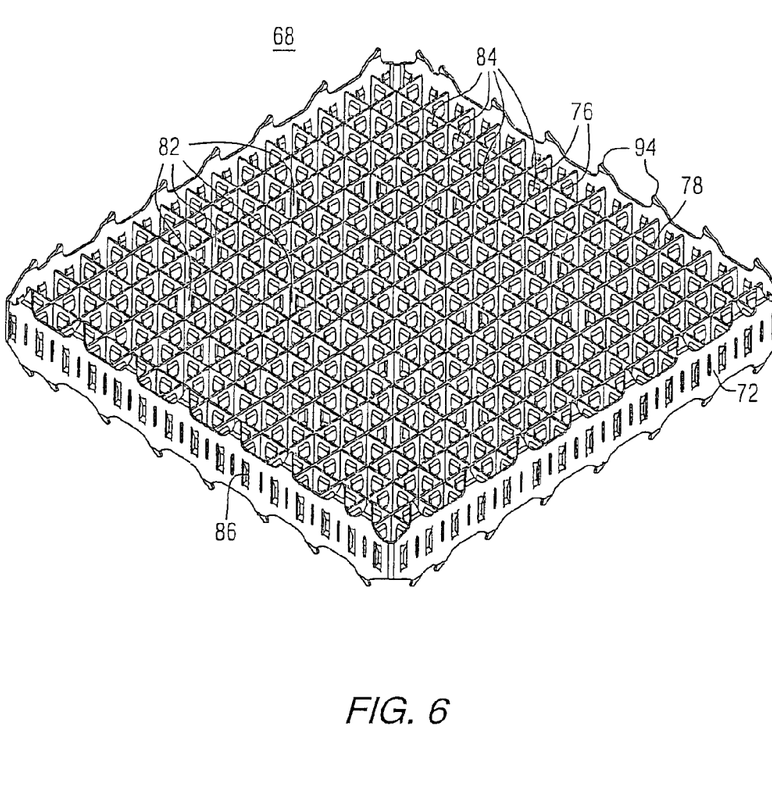
FIG. 6 is a perspective view of a preferred embodiment of the vibration resistant grid of this invention.
Figure 7:
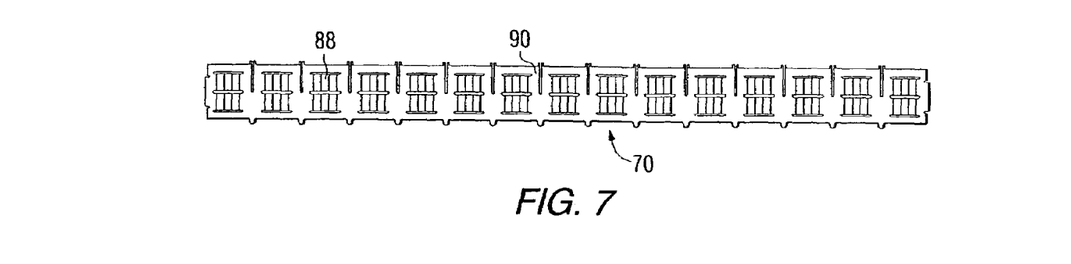
FIG. 7 is a side elevational view of one of the interior straps of the lattice assembly forming the cells of one embodiment of the auxiliary anti-vibration grid of this invention.

In the preferred embodiment of this invention, the auxiliary vibration resistant grids preferably take the form illustrated in FIGS. 6 and 7. From FIG. 6, it can be seen that the dimples and/or springs 88,86 are coplanar and contact the fuel rods on multiple sides to provide additional rod support. In this embodiment, the springs are vertical rather than on a diagonal. As stated previously for the main support grids, the location of the vibration-resistant auxiliary grids are fixed relative to the fuel assembly at the thimble locations either by welding the grids to insert tubes or by mechanically fastening the grids to the guide thimble tubes. The outer grid strap 72 and the intermediate straps 76 and 78 on the auxiliary grids are smaller in height than the corresponding dimensions of the main support grids 46. The height of the auxiliary grids is, for example, 1.6 cm. There are no mixing vanes on the preferred embodiment of the vibration resistant auxiliary grid as shown in FIG. 6, while a plurality of the main support grids 46 include mixing vanes, for example, of the type illustrated by reference character 92 in FIG. 5. The outer strap of the auxiliary vibration-resistant grids and those of the main support grids include guide tabs 94, illustrated in FIGS. 4, 5, 6 and 7 that prevent hang-up with adjacent fuel assemblies during removal or insertion Out of or into the reactor core. The inner straps 76 and 78 on the auxiliary grids provide for a larger contact area between the dimple/springs and the fuel elements than are provided by the corresponding contact areas on the main support grids 46. The contact lengths for the vertical springs and dimples on the auxiliary grids are 2.54 cm as compared to a corresponding contact length of 0.5 cm on the main support grids. This latter feature plus the location(s) of the auxiliary anti-vibration support grids 68 in the fuel assembly 16 eliminate the fuel rod instability that leads to grid-to-rod fretting in high crossflow plants with pressure relief holes. In most other respects, the auxiliary support grid is constructed in the same manner noted for the main support grids. Preferably, in a 14 foot assembly, three auxiliary vibration resistant grids are positioned between adjacent mains support grids approximately within the middle third elevation along the assembly.

While specific embodiments of the invention have been described in detail, it will be appreciated by those skilled in the art that various modifications and alternatives to those details could be developed in light of the overall teachings of the disclosure. For example, though the invention has been described with respect to a square grid pattern, the invention can be employed with other grid profiles such as rectangular or trapezoidal. Accordingly, the particular embodiments disclosed are meant to be illustrative only and not limiting as to the scope of the invention which is to be given the full breadth of the appended claims and any and all equivalents thereof.

The invention claimed is:

1. A nuclear fuel assembly comprising:
   A parallel array of elongated nuclear fuel elements supported between a lower nozzle and an upper nozzle and having an axial length along the elongated dimension of the nuclear fuel elements with a mid third region along the axial length;
   A plurality of substantially evenly spaced main support grids arranged in tandem along the axial length of the fuel elements, between the upper nozzle and the lower nozzle, at least partially enclosing an axial portion of the circumference of each fuel element within a support cell of the main support grids, with each support cell supporting only a single fuel element, to maintain a lateral spacing between fuel elements; and
   At least one auxiliary grid positioned around the fuel elements in tandem with the main support grids at an elevation in the mid third region, the auxiliary grid comprising a plurality of support cells with one support cell for each fuel element, with each support cell supporting only a single fuel element, wherein the auxiliary grid is supported between two main support grids without any other auxiliary grids between the auxiliary grid and the adjacent main support grid and wherein the main support grids have a first fuel element support assembly and the auxiliary grid has a second fuel element support assembly and the first and second fuel element support assemblies are of a different design; and
   wherein the auxiliary grid support cells have walls that respectively at least partially enclose a portion of the circumference of the fuel elements along a portion of their axial length and the second fuel element support assembly is located on the walls of the auxiliary grid support cells and comprise a second set of dimples and/or springs that continuously contact and support the fuel elements and the main support grids' cells have walls that respectively at least partially enclose a portion of the circumference of the fuel elements along a portion of their axial length and the first fuel element support assembly is located on the walls of the main support grids' cells and comprise a first set of dimples and/or springs that continuously contact and support the fuel elements, wherein the second set of dimples and/or springs on the auxiliary support cells have a larger contact area with the fuel elements than the first set of dimples and/or springs on the walls of the main support grid cells.

2. The fuel assembly of claim 1 wherein the auxiliary grid is supported substantially midway between two main support grids.

3. The fuel assembly of claim 2 including a plurality of auxiliary grids positioned between some, but not all of the main support grids.

4. The fuel assembly of claim 3 wherein adjacent ones of the plurality of auxiliary grids share one main support grid between them.

5. The fuel assembly of claim 3 wherein the auxiliary grids are positioned along a mid span of the fuel elements within the mid third region.

6. The fuel assembly of claim 1 wherein the axial length of the walls of the auxiliary grid support cells is shorter than the corresponding walls of the main support grid cells.

7. The fuel assembly of claim 1 wherein the dimples and/or springs on the walls of the respective auxiliary grid support cells are coplanar along the same horizontal plane.

8. The fuel assembly of claim 1 wherein at least some of the main support grids have mixing vanes and at least some of the auxiliary grids do not have mixing vanes.

9. The fuel assembly of claim 1 wherein the auxiliary grid has an outer strap that extends around its circumference and includes upwardly extending guide tabs that are inwardly directed at an angle of less than 90 degrees with the strap in the direction of the adjacent fuel element, to prevent hang-up with adjacent fuel assemblies during removal or insertion into a reactor core.

10. A nuclear fuel assembly comprising:

A parallel array of elongated nuclear fuel elements supported between a lower nozzle and an upper nozzle and having an axial length along the elongated dimension of the nuclear fuel elements with a mid third region along the axial length;

A plurality of substantially evenly spaced main support grids arranged in tandem along the axial length of the fuel elements, between the upper nozzle and the lower nozzle, at least partially enclosing an axial portion of the circumference of each fuel element within a support cell of the main support grids, with each support cell supporting only a single fuel element, to maintain a lateral spacing between fuel elements; and At least one auxiliary grid positioned around the fuel elements in tandem with and sandwiched between two of the plurality of main support grids at an elevation in the mid third region, the auxiliary grid comprising a plurality of support cells with one support cell for each fuel element, with each support cell supporting only a single fuel element, wherein the main support grids have a first fuel element support assembly and the auxiliary grid has a second fuel element support assembly and the first and second fuel element support assemblies are of a different design; and wherein the auxiliary grid support cells have walls that respectively at least partially enclose a portion of the circumference of the fuel elements along a portion of their axial length and the second fuel element support assembly is located on the walls of the auxiliary grid support cells and comprise a second set of dimples and/or springs that continuously contact and support the fuel elements and the main support grids' cells have walls that respectively at least partially enclose a portion of the circumference of the fuel elements along a portion of their axial length and the first fuel element support assembly is located on the walls of the main support grids' cells and comprise a first set of dimples and/or springs that continuously contact and support the fuel elements, wherein the second set of dimples and/or springs on the auxiliary support cells have a larger contact area with the fuel elements than the first set of dimples and/or springs on the walls of the main support grid cells and the full extent of the axial length of the walls of the auxiliary grid support cells is shorter than the corresponding walls of the main support grid cells.

* * * * *